United States Patent
Burger et al.

(10) Patent No.: US 9,760,401 B2
(45) Date of Patent: *Sep. 12, 2017

(54) INCENTIVE-BASED APP EXECUTION

(71) Applicant: Microsoft Technology Licensing, LLC, Redmond, WA (US)

(72) Inventors: Douglas C. Burger, Bellevue, WA (US); Daniel Lee Massey, Redmond, WA (US); Bart J. F. De Smet, Bellevue, WA (US); Blaise Hilary Aguera y Arcas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,576

(22) Filed: Nov. 14, 2015

(65) Prior Publication Data

US 2016/0147567 A1 May 26, 2016

Related U.S. Application Data

(63) Continuation of application No. 14/265,882, filed on Apr. 30, 2014, now Pat. No. 9,218,497.

(51) Int. Cl.
*G06F 9/48* (2006.01)
*G06F 9/445* (2006.01)
(Continued)

(52) U.S. Cl.
CPC ............ *G06F 9/4881* (2013.01); *G06F 9/445* (2013.01); *G06F 21/123* (2013.01); *G06F 21/62* (2013.01)

(58) Field of Classification Search
CPC ........ G06F 21/123; G06F 21/62; G06F 9/445; G06F 9/4881
See application file for complete search history.

(56) References Cited

U.S. PATENT DOCUMENTS 6,141,754 A   10/2000  Choy
6,260,035 B1   7/2001  Horvitz et al.
(Continued)

FOREIGN PATENT DOCUMENTS

EP    1835417 A1    9/2007
EP    2043009 A1    4/2009
(Continued)

OTHER PUBLICATIONS

Ra, et aL, "Improving Energy Efficiency of Personal Sensing Applications with Heterogeneous Multi-Processors", In Proceedings ACM Conference on Ubiquitous Computing, Sep. 5, 2012, 10 pages.

(Continued)

*Primary Examiner* — Kashif Siddiqui
(74) *Attorney, Agent, or Firm* — Powell IP Law, PLLC

(57) ABSTRACT

Systems and methods of a personal daemon, executing as a background process on a mobile computing device, for providing personal assistant to an associated user is presented. Also executing on the mobile computing device is a scheduling manager. The personal daemon executes one or more personal assistance actions on behalf of the associated user. The scheduling manager responds to events in support of the personal daemon. More particularly, in response to receiving an event the scheduling manager determines a set of apps that are responsive to the received event and from that set of apps, identifies at least a first subset of apps for execution on the mobile computing device. The scheduling manager receives feedback information regarding the usefulness of the executed apps of the first subset of apps and updates the associated score of each of the apps of the first subset of apps.

18 Claims, 10 Drawing Sheets

(51) Int. Cl.
G06F 21/62 (2013.01)
G06F 21/12 (2013.01)

(56) References Cited

U.S. PATENT DOCUMENTS

| | | | |
|---|---|---|---|
| 7,664,081 | B2 | 2/2010 | Luoma et al. |
| 7,716,492 | B1 | 5/2010 | Saulpaugh et al. |
| 7,987,163 | B2 | 7/2011 | Keshavarz-Nia et al. |
| 8,086,658 | B2 | 12/2011 | Wagner et al. |
| 8,131,718 | B2 | 3/2012 | Tran |
| 8,340,651 | B1 | 12/2012 | Gailloux et al. |
| 8,386,929 | B2 | 2/2013 | Zaika et al. |
| 8,417,233 | B2 | 4/2013 | Woloshyn |
| 8,493,888 | B2 | 7/2013 | Palin et al. |
| 8,560,400 | B1 | 10/2013 | Lee |
| 8,612,435 | B2 | 12/2013 | Sambrani et al. |
| 8,649,776 | B2 | 2/2014 | Tofighbakhsh et al. |
| 8,660,849 | B2 | 2/2014 | Gruber et al. |
| 9,218,497 | B2* | 12/2015 | Burger ............... G06F 9/445 |
| 2002/0129339 | A1 | 9/2002 | Callahan, II et al. |
| 2004/0014457 | A1* | 1/2004 | Stevens ............ G06Q 20/04 455/414.1 |
| 2005/0097087 | A1 | 5/2005 | Punaganti Venkata et al. |
| 2005/0138173 | A1 | 6/2005 | Ha et al. |
| 2007/0083378 | A1 | 4/2007 | Guarraci et al. |
| 2007/0100790 | A1 | 5/2007 | Cheyer et al. |
| 2007/0141984 | A1 | 6/2007 | Kuehnel et al. |
| 2007/0264991 | A1 | 11/2007 | Jones et al. |
| 2008/0313639 | A1 | 12/2008 | Kumar et al. |
| 2009/0282473 | A1* | 11/2009 | Karlson ............ H04L 63/102 726/17 |
| 2010/0009703 | A1 | 1/2010 | Sornay |
| 2010/0017853 | A1 | 1/2010 | Readshaw |
| 2010/0281427 | A1 | 11/2010 | Ghosh et al. |
| 2011/0182205 | A1 | 7/2011 | Gerdes et al. |
| 2011/0302182 | A1 | 12/2011 | Crawford |
| 2012/0115453 | A1 | 5/2012 | Zheng |
| 2012/0117005 | A1 | 5/2012 | Spivack |
| 2012/0210326 | A1 | 8/2012 | Torr et al. |
| 2012/0296955 | A1 | 11/2012 | Schmidt et al. |
| 2012/0316956 | A1 | 12/2012 | Nath et al. |
| 2012/0323794 | A1 | 12/2012 | Livshits |
| 2012/0324259 | A1 | 12/2012 | Aasheim et al. |
| 2013/0040615 | A1 | 2/2013 | Sawhney et al. |
| 2013/0080184 | A1 | 3/2013 | Streat et al. |
| 2013/0097289 | A1 | 4/2013 | Alsterlid et al. |
| 2013/0159377 | A1 | 6/2013 | Nash |
| 2013/0244636 | A1 | 9/2013 | Shukla et al. |
| 2013/0275164 | A1 | 10/2013 | Gruber et al. |
| 2014/0033204 | A1 | 1/2014 | Dodge et al. |
| 2014/0040171 | A1 | 2/2014 | Segalov et al. |
| 2014/0053260 | A1 | 2/2014 | Gupta et al. |
| 2014/0074483 | A1 | 3/2014 | van Os |
| 2014/0108307 | A1 | 4/2014 | Raghunathan et al. |
| 2014/0122603 | A1 | 5/2014 | Walsh |
| 2014/0201647 | A1 | 7/2014 | Scherpa et al. |
| 2014/0272894 | A1* | 9/2014 | Grimes ............... G09B 5/08 434/350 |
| 2014/0372429 | A1 | 12/2014 | Ziklik et al. |

FOREIGN PATENT DOCUMENTS

| | | | |
|---|---|---|---|
| WO | 0145005 | A1 | 6/2001 |
| WO | 2009021265 | A1 | 2/2009 |
| WO | 2012112404 | A2 | 8/2012 |

OTHER PUBLICATIONS

"iOS App Programming Guide", Published on: Oct. 18, 2011, 26 pages. Available at: https://developer.apple.com/library/ios/documentation/iPhone/Conceptual/iPhoneOSProgrammingGuide/ManagingYourApplicationsFlow/ManagingYourApplicationsFlow.html#//apple_ref/doc/uid/TP40007072-CH4.

"Core Bluetooth Programming Guide", Published on: Aug. 16, 2013, 7 pages. Available at: https://developer.apple.com/library/ios/documentation/NetworkingInternetWeb/Conceptual/CoreBluetooth_concepts/CoreBluetoothBackgroundProcessingForIOSApps/PerformingTasksWhileYourAppIsInTheBackground.html.

Stakic, et al., "Design Issues in Minimizing Infrastructure Requirements of Mobile Social Software Introduction System", In Proceedings of the Third International Conference on Privacy, Security and Trust and IEEE International Conference on Social Computing, Oct. 9, 2011, pp. 583-586.

Bluetooth SIG, "Bluetooth Specification—Phone Book Access Profile (PBAP) V10ROO", vol. PBAP_SPEC, No. V1OROO, Jul. 24, 2006, 41 Pages.

Lugano, et al., "To Share or Not to Share: Supporting the User Decision in Mobile Social Software Applications", In Proceedings of 11th International Conference on User Modeling, Jul. 25, 2007, 5 Pages.

Yorke-Smith, et al., "Like an Intuitive and Courteous Butler: A Proactive Personal Agent for Task Management", In Proceedings of 8th International Joint Conference on Autonomous Agents and Multiagent Systems, May 10, 2009, pp. 337-344.

"Sherpa, Superior Intelligent Personal Assistant, Now Available in the U.S. Market", Apr. 17, 2013, Available at: http://www.businesswire.com/news/home/20130417005930/en/Sherpa-Superior-Intelligent-Personal-Assista nt-U.S.-Market#.U4XOOfmSzHo, 4 pages.

Gil, et al., "Towards Intelligent Assistance for To-Do Lists", In Proceedings of the 13th International Conference on Intelligent user Interfaces, Jan. 13, 2008, pp. 1-4.

Johnson, et al., "Hyundai's Second Generation Blue Link Technology Now Powered by Google and Provides Intelligent Assistance", Jan. 6, 2014, 3 pages. Available at: http://www.hyundainews.com/us/en-us/media/pressrelease.aspx?mediaid=40200&title=la-tecnologia-blue-link-de- segunda-generacion-de-hyundai-es-facilitada-ahora-por-google-y-brinda-asistencia-inteligente.

Koch, et al., "Classification of Agents-based Mobile Assistants", In Proceedings of Workshop on Agents for Ubiquitous Computing, Mar. 10, 2004, 12 pages.

Botla, Purushotham, "Designing Personal Assistant Software for Task Management using Semantic Web Technologies and Knowledge Databases", In Working Paper CISL, May 20, 2013, 112 pages.

"Apple—iOS 7—Siri", http://www.apple.com/ios/siri/, downloaded Mar. 14, 2014, 3 pages.

"5 Free Siri Alternatives for Android—Which is the Best?", downloaded Mar. 14, 0214, 7 pages.

"Non-final Office Action from U.S. Appl. No. 14/219,501", Mailed Date: Nov. 5, 2015, 10 pages.

"International Search Report and Written Opinion Issued in PCT Application No. PCT/US2015/016726", Mailed Date: May 6, 2015, 12 Pages.

"Non-final Office Action from U.S. Appl. No. 14/187,567", Mailed Date: Jul. 21, 2015, 17 pages.

"International Search Report and Written Opinion Issued in PCT Application No. PCT/US2015/016727", Mailed Date: May 21, 2015, 9 Pages.

"Second Written Opinion Issued in PCT Application No. PCT/US2015/016727", Mailed Date: Nov. 17, 2015, 5 pages.

"Notice of Allowance from U.S. Appl. No. 14/265,882" Mailed Date: Aug. 14, 2015, 9 pages.

"International Search Report and Written Opinion Issued in PCT Application No. PCT/US2015/016728", Mailed Date: May 18, 2015, 10 Pages.

"Non-final Office Action from U.S. Appl. No. 14/274,650", Mailed Date: Oct. 2, 2015, 11 pages.

"International Search Report and Written Opinion Issued in PCT Application No. PCT/US2015/016729", Mailed Date: May 20, 2015, 9 Pages.

"Second Written Opinion Issued in PCT Application No. PCT/US2015/016726", Mailed Date: Aug. 12, 2015, 5 Pages.

"Second Written Opinion Issued in PCT Application No. PCT/US2015/016728", Mailed Date: Sep. 12, 2015, 6 Pages.

(56) References Cited

OTHER PUBLICATIONS

Oaks, et al. "Capabilities: Describing What Services Can Do", In Proceedings of 1st International Conference on Service-Oriented Computing, Dec. 15, 2003, 16 pages.
Raverdy, et al., "Efficient Context-Aware Service Discovery in Multi-Protocol Pervasive Environments", In Proceedings of the 7th International Conference on Mobile Data Management, May 9, 2006, 8 pages.
Papazoglou, et al., "Service-Oriented Computing", In Communications of the ACM, vol. 46, Issue 10, Oct. 2003, 4 pages.
Pokraev, et al., "Extending UDDI with Context-Aware Features Based on Semantic Service Descriptions", In Proceedings of the International Conference on Web Services, Jun. 23, 2003, 7 pages.
Rompothong, et al., "A Query Federation of UDDI Registries", In Proceedings of the 1st International Symposium on Information and Communication Technologies, Sep. 24, 2003, 6 pages.
Khutade, et al., "QOS Based Web Service Discovery Using OO Concepts", In International Journal of Advanced Technology & Engineering Research, vol. 2, Issue 6, Nov. 2012, 6 pages.
Tian, et al., "Web Service Discovery with UDDI Based on Semantic Similarity of Service Properties", In Third International Conference on Semantics, Knowledge and Grid, Oct. 29, 2007, 4 pages.
"International Search Report and Written Opinion Issued for PCT Patent Application No. PCT/US2015/027406" Mailed Date: Jul. 7, 2015, 9 Pages.
"Final Office Action from U.S. Appl. No. 14/187,567", Mailed Date: Mar. 21, 2016, 13 pages.
"International Preliminary Report on Patentability Issued in PCT Application No. PCT/US2015/016727", Mailed Date: Feb. 11, 2016, 7 Pages.
"Second Written Opinion Issued in PCT Application No. PCT/US2015/016729", Mailed Date: Jan. 14, 2016, 5 Pages.
"Non-Final Office Action Issued in U.S. Appl. No. 14/265,656", Mailed Date: Mar. 31, 2016, 16 pages.
"International Preliminary Report on Patentability Issued in PCT/US2015/027406", Mailed Date: Mar. 29, 2016, 6 Pages.
"International Preliminary Report on Patentability Issued in PCT Application No. PCT/US2015/016728", Mailed Date: Apr. 20, 2016, 7 Pages.
U.S. Appl. No. 14/219,501, Non Final Office Action mailed Jul. 15, 2016, 12 pages.
U.S. Appl. No. 14/187,567, Notice of Allowance mailed Jun. 15, 2016, 9 pages.
U.S. Appl. No. 14/265,656, Notice of Allowance mailed Oct. 5, 2016, 12 pages.
"International Preliminary Report on Patentability Issued in PCT Application No. PCT/US2015/016726", Mailed Date Apr. 18, 2016, 8 pages.
"Notice of allowance and Fee(s) Due issued in U.S. Appl. No. 14/274,650", Mailed Date: Apr. 29, 2016, 8 Pages.
"International Preliminary Report on Patentability Issued in PCT Application No. PCT/US2015/016729", Mailed Date: Apr. 18, 2016, 7 pages.

* cited by examiner

INCENTIVE-BASED APP EXECUTION

RELATED APPLICATIONS

This application is a continuation of U.S. patent application Ser. No. 14/265,882, entitled "Incentive-Based App Execution," filed Apr. 30, 2014, which is a continuation-in-part of U.S. patent application Ser. No. 14/187,567, entitled "Local Personal Daemon," filed Feb. 24, 2014, both of which are incorporated herein by reference. This application is also related to U.S. patent application Ser. No. 14/274,650, entitled "Accelerated Training of Personal Daemons," filed May 9, 2014; U.S. patent application Ser. No. 14/265,656, entitled "Client-side Integration Framework of Services," filed Apr. 30, 2014; and U.S. patent application Ser. No. 14/219,501, filed Mar. 19, 2014, entitled "Personal Daemon Interaction through Escalating Disclosure."

BACKGROUND

More and more people are expressing and demonstrating their interest in having computers understand them and provide personalized assistance tailored to their specific needs and context. Of course, to provide personalized assistance that is tailored to the specific needs and context of a person, the assisting process must be aware of many aspects of the person, i.e., his or her personal information. Indeed, the more aspects of the person a process knows, the better that process is in personalizing information for the person.

Quite often, the computing device that a person most often has in his or her possession is a mobile computing device, e.g., a smartphone, a tablet computing device, or the so-called "Phablet"—the category of computing devices that are a hybrid of a smartphone and a tablet computing device. Generally speaking, mobile computing devices have less processing capabilities and are operating with limited power resources. While a person may often believe that he/she may have many services and applications running on a desktop computer at one time, in the context of mobile computing devices this is not feasible. As such, the services and apps executing on mobile computing devices must be managed, especially in the context of providing personalized assistance.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods of a personal daemon, executing as a background process on a mobile computing device, for providing personal assistant to an associated user is presented. Also executing on the mobile computing device is a scheduling manager. The personal daemon executes one or more personal assistance actions on behalf of the associated user. The scheduling manager responds to events in support of the personal daemon. More particularly, in response to receiving an event the scheduling manager determines a set of apps that are responsive to the received event and from that set of apps, identifies at least a first subset of apps for execution on the mobile computing device. The scheduling manager receives feedback information regarding the usefulness of the executed apps of the first subset of apps and updates the associated score of each of the apps of the first subset of apps.

According to additional aspects of the disclosed subject matter, a mobile computing device configured to provide personal assistance to a user associated with the device is presented. The computing device comprises a processor and a memory, where the processor executes instructions to provide personal assistant to the associated user in conjunction with additional components. These additional components include a personal daemon and a scheduling manager. The personal daemon is configured to operate in the background of the mobile computing device and executes one or more personal assistance actions on behalf of the associated user. The scheduling manager is configured to, upon receiving notice of an event, determine a set of apps that are responsive to the event. Additionally, the scheduling manager identifies and executes a first subset of apps of the determined set of apps on the mobile computing device. The first subset of apps are determined/identified according to a score associated with each of the apps of the set of apps, where the first subset of apps includes apps with an associated score that meets or exceeds a predetermined threshold. In addition to executing the apps of the first subset of apps, the scheduling manager obtains feedback information regarding the usefulness of the executed apps on the mobile computing device. Based on this feedback, the score associated with each of the apps of the first subset of apps is updated for further reference.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
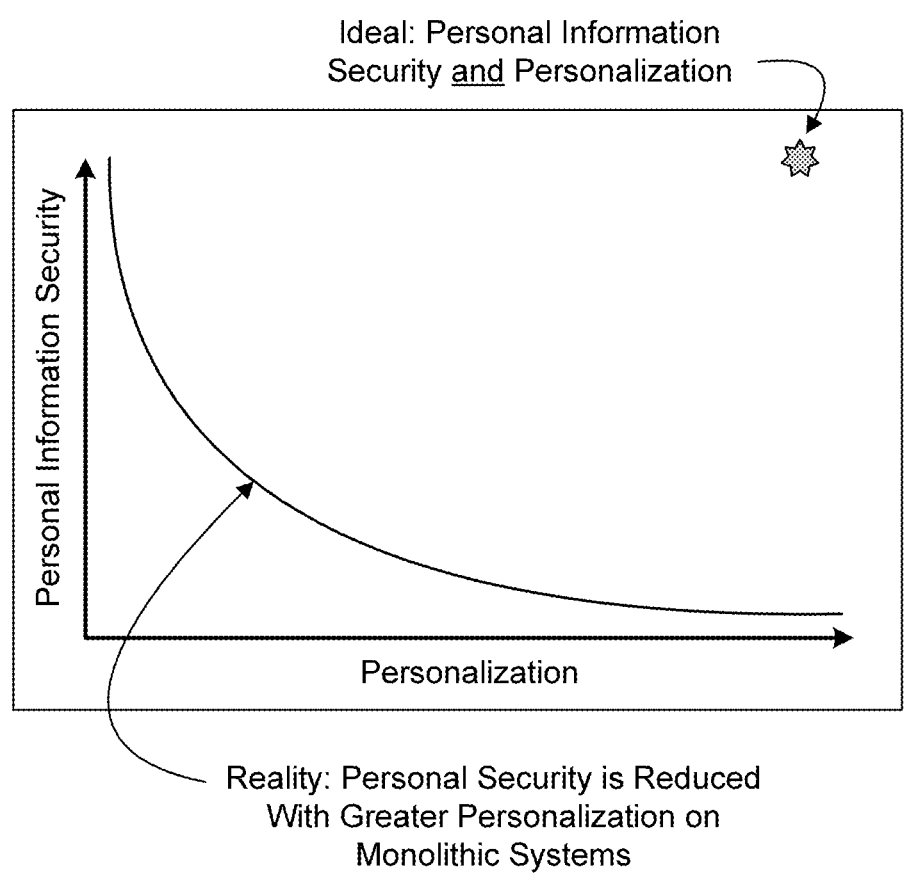
FIG. 1 shows an exemplary graph illustrating the relationship of personal information security as a function of increased personalization (with the commensurate increased amount of access to personal information) as is common to third-party, monolithic systems that provide personal assistance/personalization to multiple subscribers.

For purposes of clarity, the term "exemplary" in this document should be interpreted as serving as an illustration or example of something, and it should not be interpreted as an ideal and/or a leading illustration of that thing. The term "personal information" corresponds to information, data, metadata, preferences, behaviors, of the associated user, as well as rules for interacting with the user. Generally speaking, personal information is information about the associated user that represents some aspect of the user. The personal information may comprise data such as (by way of illustration and not limitation) gender, age, education, demographic data, residency, citizenship, and the like. Personal information may also comprise preferences and interests, expertise, abilities, and the like. Still further, personal information may comprise rules (including rules established by the associated user as well as rules that are learned and/or inferred through analysis as described below) for interacting with the associated user in providing personal assistance.

The term event, as received and acted upon by the On{Event} framework described below, refers to a picked up by an executing service (such as the On{Event} framework) that originates from either hardware sensors, software instructions, remote devices, detected conditions, and the like.

One solution in providing personalized assistance could be to deploy an online service that can provide personalized assistance to a large number of subscribers by deploying a large numbers of computers and/or processors that gather, store, collate, analyze and manipulate large amounts of data gathered from all over the world. In this monolithic model, subscribers wishing to receive personalized assistance and/or recommendations provide various items of personal information to the online service and, typically, further permit the online service to monitor numerous aspects of the subscribers' lives to learn additional personal information about them. Nearly every activity a subscribers might take (especially with regard to their computer) is captured and analyzed to identify addition personal information, these activities including but not limited to online behaviors, purchases, preferences, affiliations, banking information, etc. The online service then deploys various processes to provide personalized assistance, based on the amassed personal information that it gathers and maintains of its subscribers.

Of course, running a massive monolithic online service as described above is expensive. In order to keep such a large online service operational, the online service must have a revenue stream. Generally speaking, however, subscribers/individuals want the personalized assistance for free. Rather than directly charging the subscribers a fee for the personalization service, the online service turns to monetizing the personal information of its subscribers. A common phrase for this monetization is "ad-funded" or "vendor-funded." The online service monetizes the personal information of its subscribers by identifying individuals among its subscribers having various traits, interests, demographics, and attributes (as determined by the personal information that the online service has received and learned of its subscribers) and monetizing the identified information by placing advertisements to those individuals on behalf of advertisers. Of course, selling advertisements directed to its subscribers is only one way in which the monolithic online service (as described above) can monetize the personal information of its subscribers. Alternatively, the online service may simply sell contact lists and/or information.

Subscribers are often delighted to receive personalized assistance, so much so that they tolerate the advertisements that are frequently presented to them. Moreover, they are largely unaware of and would be extremely uncomfortable with how much of their personal information the online services possesses and monetizes/exposes to third parties (e.g., advertisers, vendors, organizations, etc.) Of course, an online service might placate its subscribers by telling stating that it will do no harm to its subscribers, yet the online service is conflicted: the online service generates revenue by providing personal information of its subscribers to third parties (whether by advertisements, selling contact lists, etc.). Moreover, the more specific the personal information that is provided to third parties, the greater the monetary reward is for the online service. Unfortunately, the more specific personal information that is exposed, the greater the risk and the more potential for abuse to the person or persons of the exposed personal information.

Of course, even without considering the risk of exposing personal information to known third parties, by simply storing substantial personal information for a large number of subscribers an online service creates an inviting, enticing target for identity thieves. So, while the level of personalized assistance can be directly correlated to the amount of personal information that is known of a person, the personal security of that person (as posed by the risk of exposure or misuse the personal information) is also a function of the amount of personal information of the person that the online service possesses. As shown in FIG. 1, while the ideal would be high personal security (i.e., security in personal information) and high personalization, in reality with a monolithic online service the level of personal security (with regard to one's personal information) decreases the as level of personalization increases.

In contrast to a monolithic online service and according to aspects of the disclosed subject matter, a personal daemon operating on a person's own computing device is presented. By way of definition, a "daemon" is a process or thread of execution, run on a computing device that is executed in the background of the computing device rather than being executed under the direct control of a computer user. However, while a daemon executes in the background of the computing device, a computer user can interact with a daemon and, through the interaction, direct the activities of the daemon. A "personal daemon" is a daemon that has access to, acquires, infers, maintains, and acts upon personal information of a computer user in providing personalized assistance. A personal daemon monitors numerous aspects of an associated user's activities to identify, infer, and/or learn additional personal information (when and where available) regarding the user as well as inferring and learning rules for acting on the user's behalf, i.e., providing personalized assistance to the user. Additionally, a personal daemon may learn and/or confirm personal information, particularly in regard to inferred information and/or rules for acting on the user's behalf, regarding the user through dialog and other interaction with the user, including confirming previously derived inferences regarding the user, requesting user preferences and other personal information, and the like.

The phrase "personal assistance," in the context of a personal daemon providing personal assistance to the associated user, should be interpreted as carrying out one or more actions on behalf of the user based. Typically, though not exclusively, the personal assistance is triggered by one or more events related to aspects of the user's current context. By way of example and not limitation, the one or more actions of personal assistance may include: providing a recommendation to the user that the user take a particular action; obtaining data and/or services on the user's behalf; confirming with the user the inference of personal information from analysis of the user's activities; confirming with the user authorization for the personal daemon take an action on behalf of the user; providing a notification to the user regarding one or more events; providing alternatives to current user activities; recommending a venue; executing an action on behalf of the user on the computing device; recommending alternative and/or related activities or items; and the like. As will be discussed in greater detail below, a personal daemon provides personal assistance to the user based on rules, personal information of the user, and/or the current context of the user.

Unlike monolithic online service option that gathers and monetizes personal information of its subscribers, according to aspects of the disclosed subject matter a personal daemon does not share the associated user's personal information with other, third-party entities, except for and according to explicit direction by the user. A third-party entity corresponds to any entity not owned and/or responsive only to the associated user.

According various embodiments of the disclosed subject matter, the personal daemon operates on the user's computing device solely for the benefit of the user. Advantageously, the personal daemon is not conflicted by the need to monetize the user's personal information to support its operation or other purposes of an external, third-party entity. Accordingly, the personal daemon enjoys a position of intimate trust by the user and can be viewed as a computer-based extension of the user. Indeed, in a real sense the associated user may refer to the relationship as a "we" relationship, i.e., me and my own personal daemon. As a consequence of this high level of trust, the user is more inclined to provide the personal daemon with a greater degree of access to all information related to the associated user and his/her use of a mobile device, including personal and/or confidential information. For example (for illustration and not limitation), because the personal daemon does not share personal information of the associated user with others, the user may be willing to permit the personal daemon to read/scan the emails of the user, have access to and monitor the user's interactions on a social network, track the user's online purchase history, maintain the user's passwords, analyze all files and data streams on the mobile device, and the like. By instilling this higher level of trust in the associated user, and obtaining access to a greater degree of personal information, a personal daemon enhances the level of personalized assistance that can be provided to the user. As will be set forth in greater detail below, based on the enhanced level of access to personal information, through an enrichment cycle of inferring the associated user's preferences and choices, and learning rules of behavior in a given circumstance, and also validating those inferences, the personal daemon becomes an extension of the associated user, reflecting the associated user's personality and providing complimentary personal assistance. Indeed, over time the personal daemon "grows," becomes more familiar, understands and knows more detail regarding the associated user, and is better able to provide personal assistance.

Figure 2:
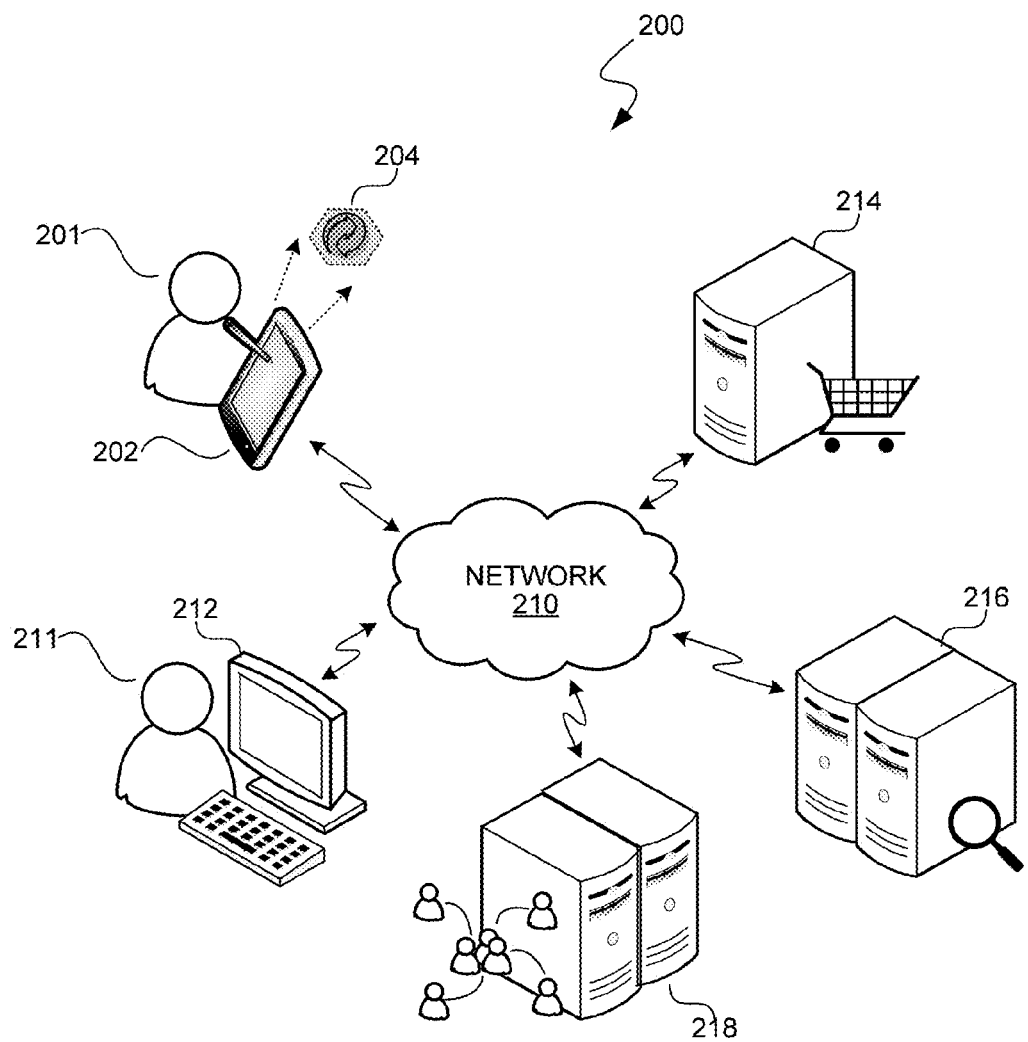
FIG. 2 is a diagram illustrating an exemplary network environment in which a computing device, suitably configured with a personal daemon, may operate.

Turning to FIG. 2, FIG. 2 is a block diagram illustrating an exemplary network environment 200 in which a computing device, suitably configured according to aspects of the disclosed subject matter with a personal daemon, may operate. More particularly, the network environment 200 includes a user's computing device 202 suitably configure to host a personal daemon 204. The personal daemon 204 executes on the computing device 202 on behalf of the person/user 201 to provide personal assistance to the user. As will be readily appreciated, suitable computing devices that may be configured with a personal daemon 204 include, by way of illustration and not limitation: tablet computing devices, such as tablet computing device 202; smart phone devices (not shown); the so called "phablet" computing devices (i.e., computing devices that straddle the functionality of typical tablet computing devices and smart phone devices); laptop computers; desktop computers; wearable computing devices; personal digital assistants, and the like.

The network environment 200 also includes a network 210 by which the user's computing device 202 (by way of components, applications, apps, etc.) can communicate with and access network accessible devices and/or online services connected to the network, including (by way of illustration and not limitation): one or more other user computing devices, such as computing device 212 associated with user 211; social networking sites, such as social networking site 218; online network services, such as a search engine 216; shopping and/or commerce sites, such as shopping site 214, and the like.

According to aspects of the disclosed subject matter, a personal daemon 204 is configured to operate on the "edge of the cloud," meaning that the personal daemon operates on the user's computing device 202, with or without connectivity to the network 210. When connectivity to the network 210 is available (via the connection of the computing device 202 to the network), the personal daemon 204 executing on the computing device can access data and services for use in providing personal assistance to the user 201.

It is readily appreciated that many users have more than one computing device. Indeed, it is common for a user to have, by way of illustration, a smart phone, a tablet computing device, a laptop computer, and/or a desktop computer. Thus, according to aspects of the disclosed subject matter, a personal daemon operating on a computing device, such as computing device 204, may be configured to share personal information regarding the associated computer user 201 with a "sibling" personal daemon, i.e., a personal daemon associated with the same user that is operating on another computing device. In other words, as a personal daemon is an extension of one's own self, the personal information maintained by one embodiment of a personal daemon on a first computing devices can share the same and all personal information with another embodiment of the personal daemon (a sibling personal daemon) on another device. Moreover, as discussed below, sibling personal daemons may be configured to cooperate in order to provide personal assistance to the associated user.

Figure 3:
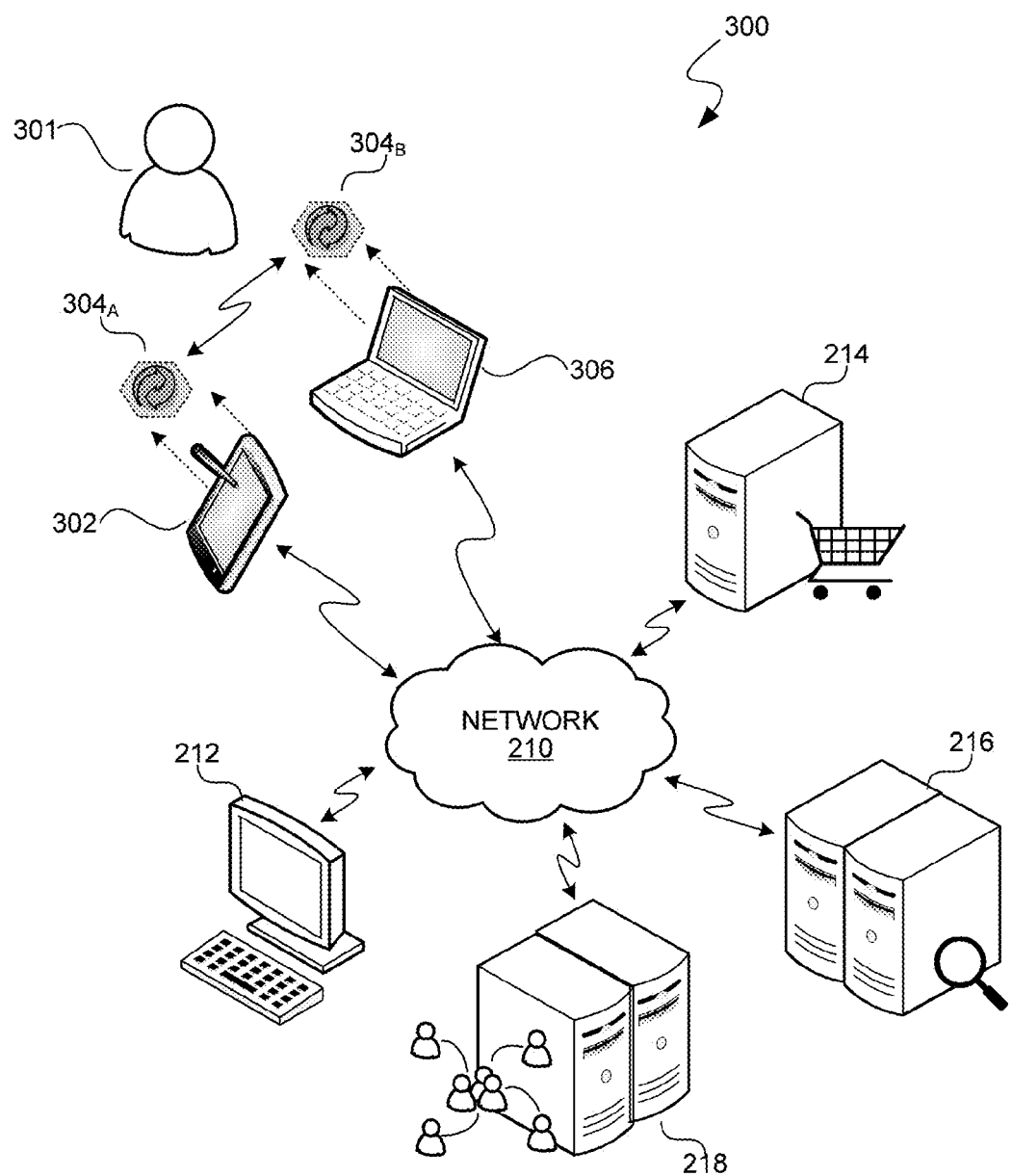
FIG. 3 is a diagram illustrating an exemplary network environment including multiple computing devices associated with the same user.

FIG. 3 is a diagram illustrating an exemplary network environment 300 including multiple computing devices 302 and 306 associated with the same user 301. As can be seen, each computing device 302 and 306 is configured with a personal daemon $304_A$ and $304_B$. These personal daemons, $304_A$ and $304_B$, are sibling personal daemons as they are associated with the same user 301. As sibling personal daemons, they may (according to user 301 authorization) share personal information of the associated user with each other, share cached data, share and/or distribute user behavior analysis to identify personal information, and the like. Sharing of the data, information, and activities may include sharing in a distributed manner, i.e., hosting some of the data on computing device with a first sibling personal daemon, offloading processing of monitored user events to the sibling personal daemon having the best capacity to conduct that corresponding analyses, and the like. Inter-communication between sibling personal daemons may occur on demand (i.e., a just-in-time manner), on scheduled intervals, on explicit instruction from the user, and the like. Of course, while considerations such as processing capacity, bandwidth, power levels, data access, and the like may be a factor with regard to distributing tasks among sibling personal daemons, these same considerations may be used in determining when a sole personal daemon performs analysis of user activity, generates inferences regarding personal information of the user, determines rules for responding to various events, and the link. Indeed, the personal daemon 204 may be configured (or may self-configure) to have minimal impact on the user's computing device.

Figure 4:
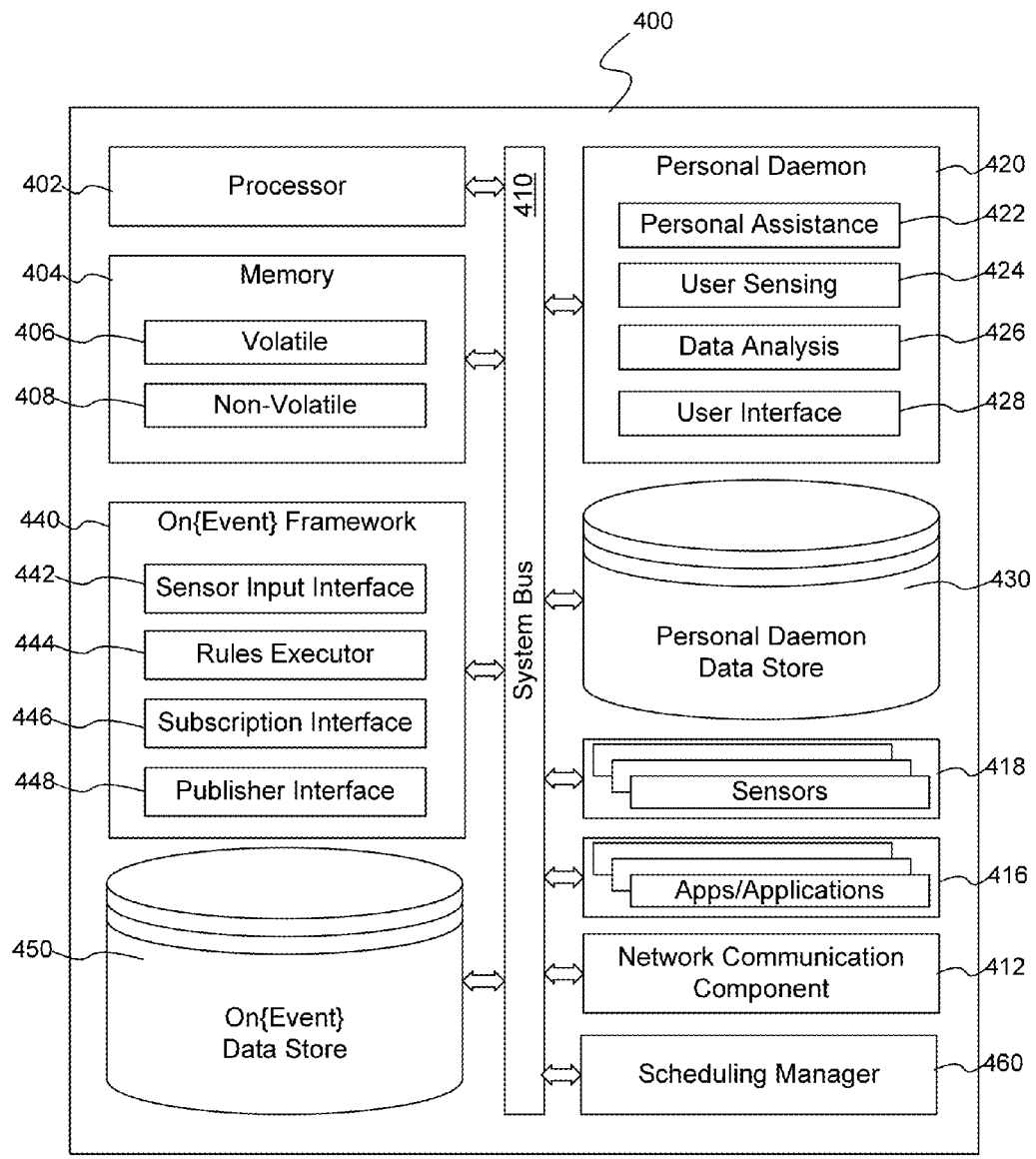
FIG. 4 is a block diagram illustrating an exemplary computing device suitably configured to provide personal assistance by a personal daemon.

Turning now to FIG. 4, FIG. 4 is a block diagram illustrating an exemplary computing device 400 suitably configured to provide personal assistance by a personal daemon. The exemplary computing device 400 includes a processor 402 (or processing unit) and a memory 404 interconnected by way of a system bus 410. As will be readily appreciated, the memory 404 typically (but not always) comprises both volatile memory 406 and non-volatile memory 408. Volatile memory 406 retains or stores information so long as the memory is supplied with power. In contrast, non-volatile memory 408 is capable of storing (or persisting) information even when a power supply is not available. Generally speaking, RAM and CPU cache memory are examples of volatile memory 406 whereas ROM, solid-state memory devices, memory storage devices, and/or memory cards are examples of non-volatile memory 408.

The processor 402 executes instructions retrieved from the memory 404 in carrying out various functions, particularly in regard to executing a personal daemon 204 that provides personal assistance to the associated user. The processor 402 may be comprised of any of various commercially available processors such as single-processor, multi-processor, single-core units, and multi-core units. Moreover, those skilled in the art will appreciate that the novel aspects of the disclosed subject matter may be practiced with other computer system configurations, including but not limited to: personal digital assistants, wearable computing devices, smart phone devices, tablet computing devices, phablet computing devices, laptop computers, desktop computers, and the like.

The system bus 410 provides an interface for the various components of the mobile device to inter-communicate. The system bus 410 can be of any of several types of bus structures that can interconnect the various components (including both internal and external components). The computing device 400 further includes a network communication component 412 for interconnecting the computing device 400 with other network accessible computers, online services, and/or network entities as well as other devices on the computer network 210. The network communication component 412 may be configured to communicate with the various computers and devices over the network 108 via a wired connection, a wireless connection, or both.

The computing device 400 also includes executable apps/applications 416. As those skilled in the art will appreciate, an application corresponds to a collection of executable instructions that carry out (through its execution on a processor) one or more tasks on a computing device, such as computing device 400. Applications are typically, but not exclusively, executed at the direction of a user of the computing device. Applications combine features available on the computing device in carrying out the various tasks (as designed by the composition of the application.) While the term "apps" is sometimes uses as a shorthand name for applications, in the alternative an app similarly corresponds to a collection of executable instructions for carrying out one or more tasks. However, in contrast to applications, apps typically, though not exclusively, are directed to a limited set of tasks, often focused to a narrow topic/feature. As the scope of an app is typically more limited than that of an application, apps typically require a smaller footprint with regard to system resources and are often more suited for execution by computing devices of limited resources. While apps/applications 418 are typically stored in memory 404, for illustration purposes only they are called out separately from the memory 404.

The exemplary computing device 400 also includes sensors 418. Typically, sensors correspond to various hardware devices that sense particular events relating to the computing device 400. Sensors 418 may include, by way of illustration and not limitation, accelerometers, haptic sensors, capacitive sensors, audio sensors, optic sensors, timers, temperature sensors, power sensors (AC vs. DC sensors, voltage sensors, etc.), wireless signal sensors, geo-location sensors, magnetic sensors, altimeters, barometric sensors, and the like. Sensors may be based on communication information, such as internet routing data, HTTP request/response inspection, MAC addresses, cellular/wireless triangulation, and the like. As those skilled in the art will appreciate, a suitably configured computing device 400 may various combinations of hardware sensors 418. Moreover, these hardware sensors, as well as software sensors (as will be discussed below), are used in monitoring the user context via an On{Event} framework.

The exemplary computing device 400 further includes a personal daemon component 420 and an On{Event} framework 440. The personal daemon 420 is the executable component which, when executed, is the personal daemon 204 that provides the personal assistance to the user. As shown in FIG. 4, the personal daemon 420 includes subcomponents/modules that carry out various functionality, include a personal assistance module 422 that provides the personal assistance to the associated user based on current context of the user. The user sensing module 424 interfaces with the On{Event} framework 440 to track/sense aspects of the user's current content. The data analysis module 426 analyzes user-related information to make and confirm inferences regarding the user, including inferring addition personal information of the user. The user interface module 428 provides an interface by which the user can interact with the personal daemon 204 on the computing device 400. The personal daemon component 420 maintains personal information regarding the user, as well as other user-related information, in a personal daemon data store 430.

Regarding the On{event} framework 440, the On{event} framework ("framework") is an extensible event/action framework, i.e., the framework detects events that occur with regard to the one or more sensors (including sensors 418 as well as events of other applications, apps, services, remote signals, and the like) and, in response, executes actions associated with the detected events on the computing device 400. It is extensible in that sensors can be added, including software sensors, and subscribers can subscribe to sensed events.

According to aspects of the disclosed subject matter, sensors are registered with the framework 440. By default or as part of an initialization process, all or some of the sensors 418 may be registered with the framework 440. Additionally, apps and/or applications (including the apps/applications 416) can register as software sensors with the framework 440, where a software sensor identifies the event (or events) that it will signal and the data that may be associated with the signaled event. Software sensors register with the framework 440 through a publisher interface 448. Sensors, including sensors 418 and software sensors, signal the sensed event through a sensor input interface 442. As indicated, upon receiving a sensed event, a rules executor 444 executes one or more actions on the computing device 400 associated with the sensed event, as established in the On{Event} data store 450. Apps and applications can register as subscribers to sensed/signaled events in the framework 440 by way of a subscription interface 446. In subscribing to a sensed event, an app or application, as well as the personal daemon 204 executing on the computing device 400, indicates the events for which the subscribing app, application, or daemon, wishes to be notified.

Regarding the On{event} framework 440, while those skilled in the art will appreciate that there may be a variety of alternatives to implement the framework, in one embodiment the framework 440 is implemented as a background service built upon the Node.js technology from Node.js Developers. The Node.js technology is extensible and robust such that it can interface with hardware sensors, such as sensors 418, as well as software sensors. Similarly, the personal daemon component 420 may be implemented upon the Node.js technology. Apps and applications, including apps/applications 416, interface with Node.js processes by way of JavaScript® code. While both the On{event} framework 440 and the personal daemon component 420 may be implemented using other technologies than Node.js, Node.js may be advantageously used as it enjoys a relatively small footprint on the host computing device, such as computing device 400, has configurations for deployment on a number of various operating system platforms, and JavaScript® programming languages enjoys broad support.

The exemplary computing device 400 further, still, includes a scheduling manager 460. As will be described in greater detail below, the scheduling manager 460 coordinates the execution of the apps and applications 416, as well as other services that may available to the computing device 400 but offered by another, external device or service. According to various embodiments, the scheduling manager 460 operates in conjunction with, or is implemented as a part of, the On{Event} framework 420 in responding to detected events from the various sensors 418 (including both hardware and software sensors), as well as in providing the contextual information/factors, services and data that the personal daemon 420 may need in providing personalized assistance to an associated user. In other, alternative embodiments, the scheduling manager 460 may be implemented as a component of, or independently in cooperation with, the personal daemon 420.

Regarding the various components of the exemplary computing device 400, those skilled in the art will appreciate that these components may be implemented as executable software modules stored in the memory of the computing device, as hardware modules (including SoCs—system on a chip), or a combination of the two. Moreover, each of the various components may be implemented as an independent, cooperative process or device, operating in conjunction with one or more computer systems. It should be further appreciated, of course, that the various components described above in regard to the exemplary computing device 400 should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

Regarding the exemplary computing device 400, it should be appreciated that while the personal daemon is configured to interact with the associated user via the components of the computing device, generally speaking the personal daemon is independent of any particular configuration of computing device. Indeed, the personal daemon may be implemented on any suitable computing device and may communicate via displayed messages on a display component, text messages, audio and/or voice communications, haptic signals, and combinations thereof.

In addition to being implemented on one computing device, or across multiple computing devices via sibling personal daemons, a personal daemon may be further configured as a public mask to cooperatively operate in a joint computing manner with other services and/or processes in providing personal assistance to the associated user and/or performing analysis of user activity in order to learn and/or infer additional personal information regarding the user. However, the personal daemon operates in such a configuration (joint computing) according to the approval of the associated user and is restricted in sharing personal information with the joint processes/services according to the associated user's rules for doing so. According to aspects of the disclosed subject matter, in addition to sharing personal information with other third-party entities (e.g., processes and/or services) according to the associated user's explicit rules, the personal daemon may be configured to track what personal information is disclosed to these other entities. In tracking the disclosure of personal information to other entities, the personal daemon is able to inform the associated user what has been disclosed such that the user may identify limits to the amount of personal information that may disclosed. Indeed, an associated user may establish a limit of personal information that may be disclosed where after the personal daemon obfuscates any additional personal information that may be requested by any one entity or set of entities.

Figure 5:
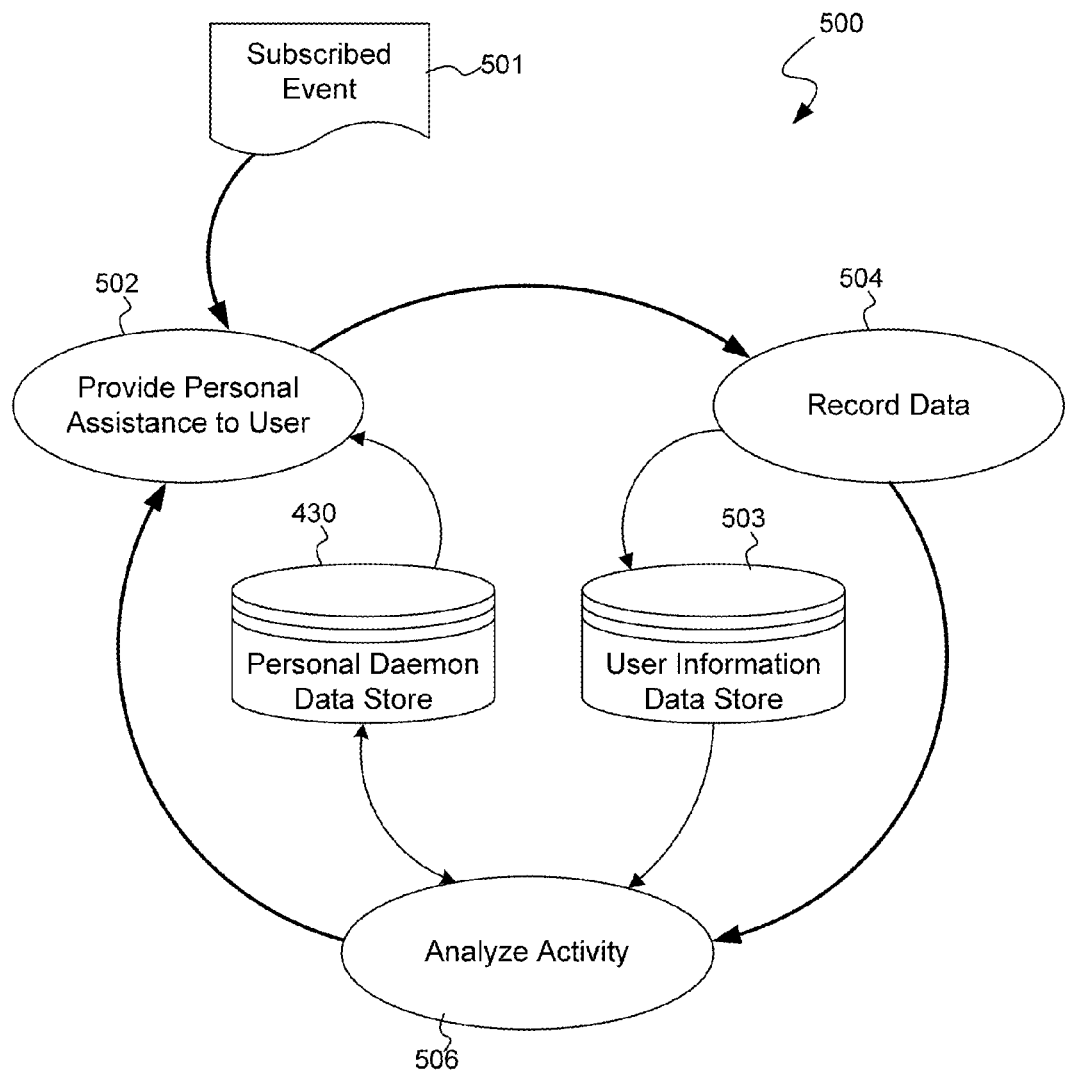
FIG. 5 is a block diagram illustrating exemplary processing stages of a personal daemon according to aspects of the disclosed subject matter.

Turning now to FIG. 5, FIG. 5 is a block diagram 500 illustrating exemplary processing stages of a personal daemon, such as personal daemon 204, in regard to user related activity. These processing stages represent an enrichment cycle for the personal daemon, i.e., the processes of learning/inferring information regarding the associated user and then applying the information the benefit of the associated user. To begin the discussion, we can assume that the personal daemon receives notice of a subscribed event 501. By way of example and not limitation, an event may indicate that the user's computing device is receiving an incoming telephone call, or that the associated user has changed his/her location (as sensed by the geo-location sensor on the computing device).

Upon receiving notice of the subscribed event 501 and according to information associated with the event, the personal daemon determines whether to provide personal assistance to the associated user in regard to the event, as indicated by circle 502. This determination is based on the information regarding the current context of the associated user, including personal information of the user, as well as rules previously established for the particular combination of events and context. For example, assume that the associated user is currently at work and the personal daemon knows this according to events received regarding the geo-location of the user's smart-phone/computing device according to rules and personal information in the personal daemon data store 432. Additionally, as a rule (which rule the personal daemon has either learned through inference, explicit direction from the user, or a combination of the two), the user typically does not take phone calls on his or her smart-phone while at work. However, yet another rule established with the personal daemon (again by inference, explicit instruction, or both) that the associated user will answer his or her smart-phone if it is during lunch or it is from specific individuals (such as a spouse.) Thus, at circle 502, when the subscribed event 501 is in regard to an incoming telephone call, the personal daemon receives the event and provides personal assistance to the user according to its rules regarding the user and the user's current context. Thus, if the information associated with the event indicates that the incoming telephone call is from an acquaintance, the personal daemon 204 according to its internal rules may immediately direct the incoming telephone call to an answering service. Alternative, if the information associated with the event 501 indicates that the incoming telephone call is from a spouse, the then personal daemon 204 can provide personal assistance to the associated user by permitting the incoming call to ring on the user's smart phone.

In addition providing immediate personal assistance, as indicated in circle 504, another part of the personal daemon 204 records information/data in regard the received event 501 in a user information data store 503. According to aspects of the disclosed subject matter, the personal daemon 204 records and logs events, contexts, and data associated with the user and the user's activities. This information is then used later in the analysis of user information, as indicated by circle 506, in learning and making inferences regarding additional personal information regarding the user, and in also learning rules for providing personal assistance to the user in regard to various events and contexts. This learning activity is described below in regard to routine 700 of FIG. 7. Of course, event information is not the only data that is stored in the user information data store 503. The personal daemon 204, due to its trusted position, also monitors user activity with regard to other apps, applications, online activities and the like to gain additional personal information. Submitted search queries, browsing history, social network site interactions, retrieved news articles, and the like are recorded in the user information data store such that the analysis activity (as denoted by circle 506) can refine and augment the personal information the persona daemon maintains regarding the associated user. While the user information data store 503 is indicated as being a separate entity from the personal daemon data store 432, this is for illustration purposes and should not be construed as limiting upon the disclosed subject matter. According to various embodiments, the user information data store 503 is a part of the personal daemon data store 432.

In analysis activity, as indicated by circle 506, the personal daemon 204 analyzes the information, as found in the user information data store 503, regarding the associated user, as well as and in light of the personal information know about the associated user in the personal daemon data store 432. The analysis activity uses neural networks, machine learning models, pattern recognition, and the like to infer information regarding the associated user. The analysis activity may further validate its inferences with the associated user by way of a confirmation dialog, though not necessarily in synchronicity upon deriving various inferences. The inferences may include static personal information (e.g., where the associated user works, the username/password of the user on a social networking site, etc.) or dynamic personal information (e.g., rules for responding to particular events, etc.) Based on the results of the analysis, the personal information regarding the associated user is refined and/or augmented in the personal daemon data store 432. Regarding the confirmation dialog, while this "dialog" may involve a user-interface control often referred to as a "dialog" or "dialog control", in fact the dialog may take on any number of forms of a human-to-personal assistant interaction including, by way of illustration and not limitation, spoken instructions and/or confirmations, haptic feedback, gestures, and the like.

It should be appreciated that the analysis activity, as indicated by circle 506, will often include a confirmation dialog with the associated user. Typically, inferences are associated with some level of confidence. Except for the occasions in which the analysis activity produces an inference with near certainty of confidence, the personal daemon will often need to interact with the user in a confirmation type dialog, where inferences of personal information are presented to the user for confirmation or rejection. With regard to the example of determining the location where the associated user works, upon the first inference the personal daemon may engage the associated user with a dialog such as "Is this your work location?" The associated user may confirm or reject the inference. For example, the associated user may indicate that inferred location it is not a work location, but location of a school that the associated user attends. Through confirmation dialogs, as well as explicit review of inferred personal information and rules, the user exercises complete control over his/her personal information.

As part of or as a result of learning/inferring addition personal information regarding the user, and as part of providing personal assistance to the associated user (circle 502), the personal daemon may take proactive steps such as downloading data that may be relevant to the user. For example, as part of learning the location where the associated user works and based on personal information about the user that he or she likes a particular cuisine, the personal daemon may proactively download restaurant information surrounding the user's work location for future reference. Based on personal information regarding the associated user's work location and commuting habits, the personal daemon may associate a rule with a timer event to check the traffic situation for the commute and provide recommendations to the user when poor commuting conditions are present.

A distinct advantage that a personal daemon 204 has over a monolithic online service is that the personal daemon needs only maintain data relevant to the associated user. Maps, restaurants, calendars of events, etc. that are relevant to the associated user, as well as recording user related information such as search queries, browsing history, social networking profiles, etc., requires substantially less storage capacity than capturing and storing all information to serve a large number of users. Indeed, while the amount of information that may be of relevance to the user is not insignificant, in the context of the capacity of current computing devices, maintaining such information on a computing device is manageable. Additionally, as the personal daemon is situated on the "edge of the cloud," to the extent that information is not currently available, is temporal, or is beyond the capacity of its host computing device, the personal daemon 204 can access such information online. For example, in the above-mentioned example of obtaining traffic information regarding the associated user's commute, the personal daemon may be configured to access the traffic information from an external source rather than retrieving and storing the information in the user information data store 503.

As indicated above, the personal daemon 204 does not share personal information regarding the associated user with other entities except as explicitly directed by the user. For example, the user may subscribe to a social networking site where access to the site is gained by supplying a password. Further, the personal daemon may establish rules for providing notice to the associated user whenever content is posted on the social networking site by a particular user. While the personal daemon 204 may associate a timer rule to periodically check on the social networking site for such posts, to access the information the personal daemon would need to provide the user's password and account information to the site to gain access. This activity, of course, is divulging the user's personal information. However, based on rules established by the personal daemon and according to explicit or inferred authorization by the associated user, the personal daemon may be authorized to divulge the personal information in providing personal assistance to the user. Of course, as the personal daemon 204 improves its efficiency at providing personal assistance to the user, actions may be taken by the personal daemon on the user's behalf when confidence, based on developed patterns and levels of trust, is high.

Of course, in the preceding example, the networking site may capture certain personal information regarding the user, e.g., user preferences, demographic information, geographic information, etc. Moreover, the networking site may also be vendor-funded such that advertisements are presented to the user when accessing the site. This, then, illustrates that while the personal daemon 204 does not share personal information regarding the associated user, the associated user is not restricted out of accessing and interacting with sites that may be vendor-funded through the disclosure of personal information, including the monolithic online sites discussed above.

Figure 6:
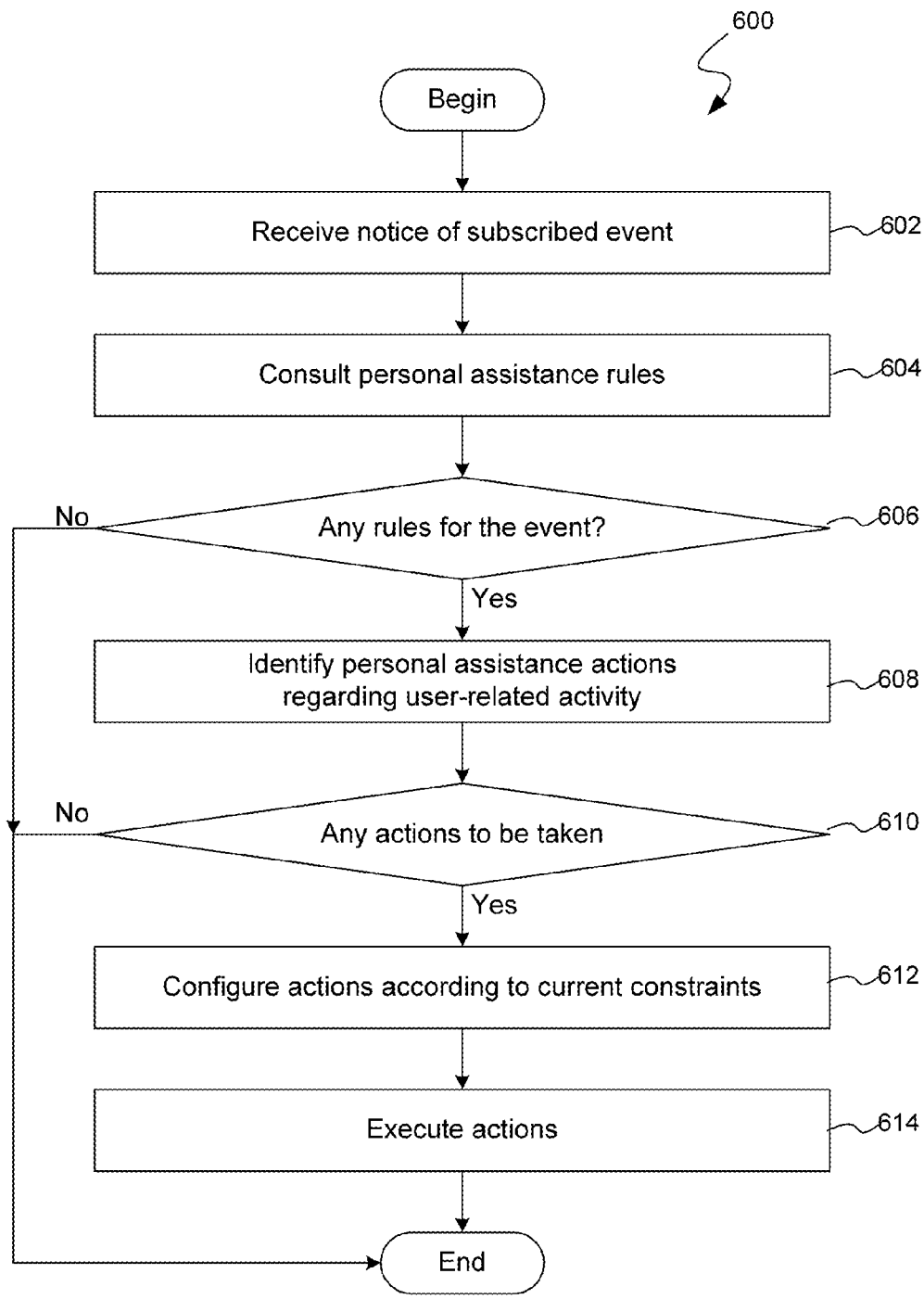
FIG. 6 is a flow diagram illustrating for providing personal assistance by a personal daemon.

FIG. 6 is a flow diagram illustrating an exemplary routine 600, as implemented by a personal daemon 204, in providing personal assistance to the associated user in response to an event related to the user. Beginning at block 602, the personal daemon 204 receives notice of a subscribed event 501. As suggested above, the subscribed event may correspond to any number of events sensed by both hardware and software sensors. At block 604, the personal daemon consults the personal daemon data store 432 for personal assistance rules corresponding to the received event. At decision block 606 a determination is made as to whether there are any rules associated with the received event. If there are no rules associated with the received event 501, the routine 600 terminates. Alternatively, if there are rules associated with the received event 501, the routine 600 proceeds to block 608.

At block 608, the personal daemon identifies personal assistance actions to be taken in regard to the received event. At decision block 610, if there are no actions to be taken, the routine 600 terminates. However, if there are actions to be taken, at block 612, the actions are configured according to current constraints. Generally speaking, configured the action according to current constraints comprises adapting the execution of the action according to the current context of the associated user. Personalization rules for adapting an action may be determined for the current context from the personal daemon data store 432. For example, if the received event is in regard to traffic congestion on the associated user's typical route home, the action may be to notify the user of the traffic congestion and suggest an alternative. Further still, the current context of the user may be that he/she is currently in a meeting and he/she should not be notified of non-emergency items during meetings. Hence, configuring the action according to current constraints would mean delaying the delivery of the suggested alternative route until the meeting is over. At block 614, the configured actions are executed in according to the various constraints, if any, from block 612. Thereafter, the routine 600 terminates.

Figure 7:
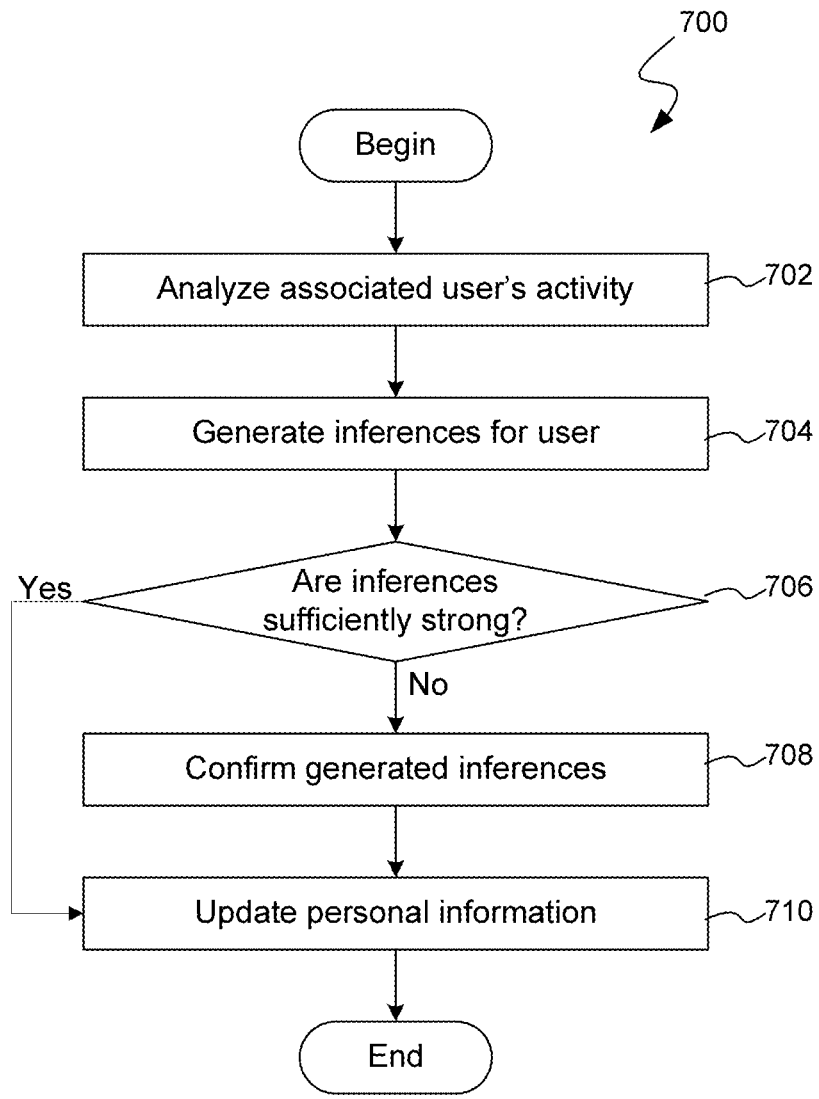
FIG. 7 is a flow diagram illustrating an exemplary routine for conducting analysis of user activity to learn and adapt to additional personal information of the associated user

As suggested above, one of the advantages of the trusted nature of a personal daemon is that it can use its access to the associated user's personal information to learn additional personal information through analysis activity (see circle 506 of FIG. 5), including both data and rules of behavior, in order to more fully become an extension of the user. FIG. 7 is a flow diagram illustrating an exemplary routine 700 for conducting analysis of user activity to learn and adapt to additional personal information of the associated user. Beginning at block 702, the user's actions are analyzed. This analysis is made on current and historical information and actions of the associated user, currently established rules, as well as the user's personal information (as maintained by the personal daemon in the personal daemon data store 430).

At block 704, one or more inferences are generated according to the analysis activity of block 702. These inferences generate additional and/or refined personal information of the associated user, as well as additional and/or refined rules for providing personal assistance to the user. As used herein, generating inferences regarding the associated user corresponds to inferring information about the user, rules for providing personal assistance to the user and the like. As indicated above, the generated inferences are made upon the various events and associated contexts regarding the user, both current and past, the user's interaction and behaviors with regard to the events, personal information of the user, as well as previously inferred rules for providing personal assistance to the user. As those skilled in the art will appreciate, inference can be employed to identify a specific context or action, or can generate a probability distribution over candidate states. An inference can be probabilistic, i.e., the inference may be associated with a probability or likelihood of occurrence with regard to a given state of interest based on a consideration of data and events. Inference techniques can be employed to generate higher-level events, e.g., rules for providing personal assistance from a set of recorded events and/or know or assumed data. Thus, inferences can result in the construction of new information or actions/rules from a set of observed events and/or stored event data. Advantageously, the inferences may be generated from events and data are not necessarily correlated in close temporal proximity, and/or from events and data that come from one or more sources.

Assuming that the generated inferences were determined as a probabilistic inference, at decision block 706 a determination is made as to whether or not any of the generated inferences are sufficiently "strong" that they do not need to be confirmed by the associated user. In one exemplary embodiment (for illustration and not limitation), an inference is sufficiently strong if the likelihood of occurrence is greater than a predetermined threshold value, e.g., a 95% estimated likelihood of occurring given the same (or substantially similar) events, context, and data. In an alternative embodiment, all inferences regarding the user's personal information or rules for providing personal assistance to the user that are generated in the analysis activity are confirmed with the user before implementation. Alternatively still, implementation and use of the inferred personal information and rules may conditionally occur, pending further confirmation, when the probabilistic likelihood exceeds a predetermined threshold, e.g., a 75% estimated likelihood of occurrence.

In the event that one or more generated inferences are not sufficiently strong, or that all inferences should be confirmed, at block 708 the inferences are confirmed with the user. Confirming inferences typically involves user interaction to confirm inferred personal data and/or rules for providing personal assistance. In confirming the generated inferences, the bases for the inference may be presented to the user, i.e., the event, personal information and context upon which the inferences was drawn. As will all of the personal information (including both data and rules for providing personal assistance) maintained by the personal daemon, the associated user has full control over this data such that he/she may delete, modify, confirm any and all parts of such personal information. This is important as an inferred rule may involve disclosing personal information regarding the user to another service or entity, in which case it is important for the associated user to be able to exercise control over such data (including stopping the dissemination of the data, permitting the disclosure in the particular context, and the like.)

Confirming inferences may involve a dialog between the personal daemon and the associated user (on the user's mobile device) in which the personal daemon iterates through the unconfirmed inferences, iteratively presenting each unconfirmed inference (and, potentially, the bases for its generation) and requests feedback from the user, including acceptance, modification, delaying a decision, or rejection. As an alternative to this dialog approach, or in addition to this iterative dialog approach, when conditions in which an unconfirmed inference may be used in providing personal assistance to the user, a dialog (i.e., a presentation to the user on the mobile device which may involve displaying information on a display screen, an audio presentation, signaling the user in some fashion, etc.) specifically directed to the unconfirmed inference at current issue may be presented to the user. For example, assuming that the personal daemon recognizes that the associated user is preparing to leave work for his/her home residence, a notice may be generated to the user from the personal daemon suggesting that the daemon check on the traffic status of the user's typical route home.

At block 710, after having confirmed the generated inferences or, the generated inferences are of sufficient strength that the user does not wish to confirm them, the associated user's personal information, including both data and rules for providing personal assistance, are updated. Thereafter, routine 700 terminates.

As those skilled in the art will readily appreciate, through this process of analysis of user activity and data, generation of inferences regarding the user, and confirmation of inferences, the personal daemon continually adapts itself to provide ever improving personal assistance. Continued application of these steps (analysis, inference, confirmation, and—of course—application of the information via personal assistance) refines the personal daemon to the point that it literally becomes an extension of one's self, reflecting the preferences and habits of the associated user.

Regarding routines 600 and 700, as well as routine 1000 described below and other processes, while these routines/processes are expressed in regard to discrete steps, these steps should be viewed as being logical in nature and may or may not correspond to any actual and/or discrete steps of a particular implementation. Nor should the order in which these steps are presented in the various routines be construed as the only order in which the steps may be carried out. Moreover, while these routines include various novel features of the disclosed subject matter, other steps (not listed) may also be carried out in the execution of the routines. Further, those skilled in the art will appreciate that logical steps of these routines may be combined together or be comprised of multiple steps. Steps of routines 600, 700, and 1000 may be carried out in parallel or in series. Often, but not exclusively, the functionality of the various routines is embodied in software (e.g., applications, system services, libraries, and the like) that is executed on computing devices as described in regard to FIG. 4. In various embodiments, all or some of the various routines may also be embodied in hardware modules, including but not limited to system on chips, specially designed processors and or logic circuits, and the like on a computer system.

These routines/processes are typically implemented in executable code comprising routines, functions, looping structures, selectors such as if-then and if-then-else statements, assignments, arithmetic computations, and the like. The exact implementation of each of the routines is based on various implementation configurations and decisions, including programming languages, compilers, target processors, operating environments, and the link. Those skilled in the art will readily appreciate that the logical steps identified in these routines may be implemented in any number of manners and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions store stored on the computer-readable storage devices are executed, they carry out various steps, methods and/or functionality, including those steps, methods, and routines described above in regard the various routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

According to aspects of the disclosed subject matter, numerous technical benefits are realized through the use of a personal daemon over alternative solutions. These technical benefits include, by way of illustration, improved latency in providing personal assistance as the personal daemon resides and executes on the "edge of the cloud" thereby eliminating the communication time with a remote service;

correspondingly, local execution minimizes the bandwidth usage over the network; elements of the personal daemon (such as determining personal information and inferences by analysis) may be executed during non-peak processing times, i.e., when the user's demands on the computing device are low; enables personal assistance even when the computing device does not have network connectivity; makes use of preemptive caching of information based on predicted needs, which caching may be completed at times of network connectivity; low cost of implementation as the personal daemon operates within bounds of the associated user's own computing device; provides substantially improved data security as personal information is not shared with others without explicit rules to do so; and provides proactive augmentation of personal data and personal assistance without third party surveillance.

With all of the potential apps, applications, and services that could be used in providing personalized assistance to an associated user, when a personal daemon 204 is implemented on a mobile computing device, such as computing device 202, that is typically limited in computing resources (such as processing bandwidth, available power, current processing load, availability of resources, and the like), it is advantageous that only those services (or apps or applications) that are most likely to provide relevant data or features for the associated should be executed. Of course, the services or apps or applications on a mobile computing device that are most likely to provide relevant data or functionality is not a fixed set—the importance of rendered services, data, and functionality may change depending on the current context. For example, services that determine the highway congestion on the associated user's typical route to or from work are important during the user's commuting times and on those days that the user commutes to/from work. They are not particularly useful during the times that the associated user is not commuting to/from work, or on days that the associated user does not go to work. However, even on days or at times that the associated user does not typically commute, when a personal daemon 204 can determine that the associated user is actually commuting to work, executing the services that determine highway congestion would be useful for the personal daemon in providing personalized assistance to the associated user.

According to aspects of the disclosed subject matter, a scheduling manager 460 is used to coordinate the execution of apps, applications, and services (or, more aptly stated, in obtaining services), both on the local device (e.g., mobile computing device 202) and on remote devices including sibling computing devices. The scheduling manager 460 rewards those apps (used generally for apps, applications, and/or services) that are determined to provide useful data given the current context with improved scores, and penalizes the apps that are determined to not provide useful data given the current context with depreciated scores. Generally speaking, using the scheduling manager 406, apps associated with higher (improved) scores are executed more frequently given the same or similar set of contextual conditions as those apps associated with lower (depreciated) scores.

The determination as to whether an app provides useful data (or service or functionality) is made according to various criteria which can be generally classified as feedback and context. Elements of feedback include, but are not limited to: explicit user execution of an app and frequency of user execution; the type and amount of user interaction with the app; execution of the application and frequency of execution by the personal daemon 204; explicit evaluation feedback by the personal daemon, and the like. The context includes items such as the time of day, day of week, day of year, holiday and holiday season, geographic location, current weather conditions, whether the associated user is currently participating in a meeting, whether the associated is in a telephone conversation, whether the associated user is determined to be driving, wearable devices configured to sense user emotions, and the like. Further still, context may be based on more than a list of contextual criteria. Contextual items may be based on inferences: e.g., the concurrent execution of one or more apps with other events may be a strong indication of a context criteria that is not currently "listed." Of course, as the personal daemon 204 identifies these inferences, the addition to the known set of contextual criteria may be augmented. These criteria are evaluated by a machine learning engine within (or in operation with) the scheduling manager 460. Information identifying the executed app (or service), feedback signals (more than one source of feedback may be obtained), and contextual information are provided to the machine learning engine and a score associated with the app is updated as appropriate. The information, including feedback and contextual information, is stored with information regarding the executed app for further reference. As those skilled in the art will appreciate, machine learning techniques, algorithms, and systems, also referred to as neural networks, are known in the art.

Figure 8:
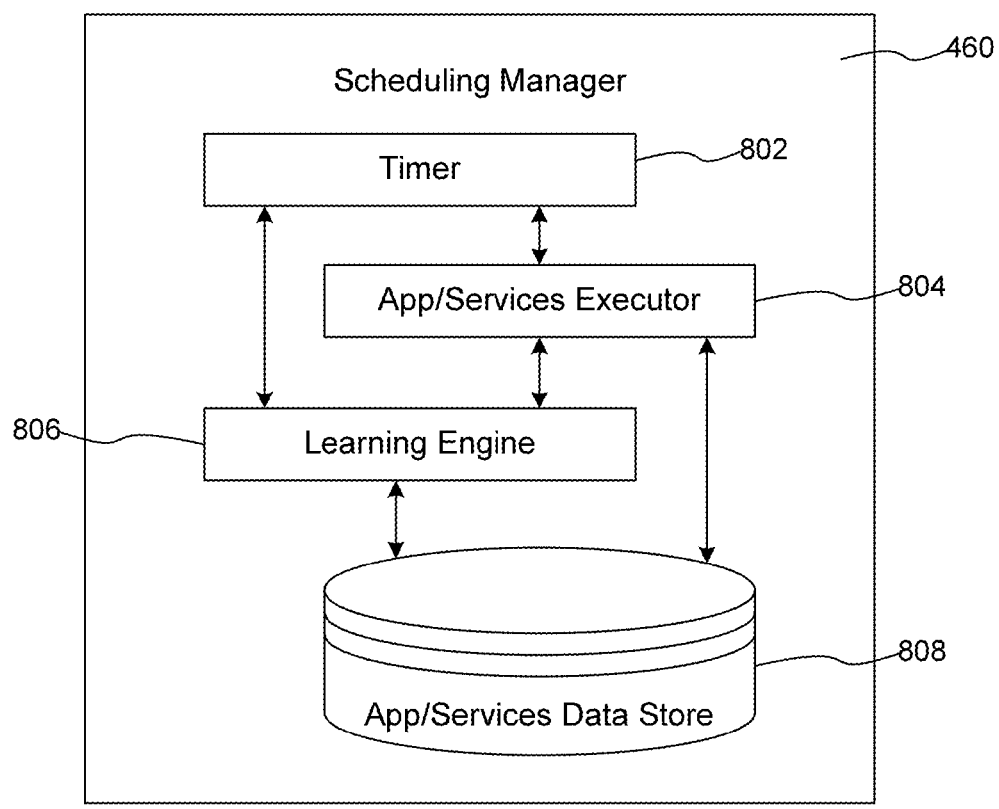
FIG. 8 is a block diagram illustrating exemplary components of a scheduling manager configured according to aspects of the disclosed subject matter.

Turning to FIG. 8, FIG. 8 is a block diagram illustrating exemplary components of a scheduling manager 460 configured according to aspects of the disclosed subject matter. As shown, the exemplary scheduling manager 460 includes an app/services executor 804. The app/services executor 804 obtains the current context associated with the computing device 202, including obtaining the current date, time, day of year, and day of week from a timer 802, and determines an initial set of apps to execute from the apps, applications, and services stored in an apps/services data store 808 maintained by the scheduling manager 460. The apps/services executor 804 orders the apps (and services) according to their score given the current contextual information. Additionally, the apps/services executor 804 obtains information regarding the current capabilities of the computing device 202, such as (but not limited to) the processing load of the device, the processing capabilities of the device, the current capacity of the computing device's power supply, the availability and bandwidth of network connectivity, availability of data/resources needed to execute an app, and the like. Based on this information, the app/services executor identifies a first subset of apps of the initial set and executes the apps of the first subset of apps for the benefit of the associated user. According to aspects of the disclosed subject matter, the number of apps in this first subset of apps may be zero, indicating that no action should be taken at the current time. According to additional aspects of the disclosed subject matter, apps are included in the first subset of apps only if the scores associated with the app given the current context meets or exceeds a predetermined threshold.

Optionally and in addition to identifying a first subset of apps to be executed on the computing device 202, the apps/services executor 804 may also identify a second subset of apps of the initial set that may be executed by other devices, including sibling computing devices such as sibling computing device 206, for the benefit of the associated user 201 of the local computing device 202. These, too, are executed on behalf of the associated user 201.

It should be appreciated, of course, that the apps/services executor 804 of the scheduling manager 460 may further allocate processing resources to various other tasks (including tasks offered by apps, services, and/or various daemons executing on the local computing device—referred to as service processing) in addition to the first and second subsets of apps. Indeed, the apps/services executor 804 may budget or allocate time for service processing especially where such processing demands fall outside of the typical demands of executing an app. For example, the analysis or mining of a large data set may require substantial processing but can be performed as a background service and completed over time. Of course, the apps/services executor 804 may consider current processing loads and demands in budgeting for service processing.

In addition to executing the apps, the apps/services executor 804 monitors for and/or receives the feedback described above. The feedback includes, but is not limited to: explicit user execution of an app and frequency of user execution; the type and amount of user interaction with the app; execution of the application and frequency of execution by the personal daemon 204; explicit evaluation feedback by the personal daemon, and the like. The context includes items such as the time of day, day of week, day of year, geographic location, whether the associated user is currently participating in a meeting, whether the associated is in a telephone conversation, whether the associated user is determined to be driving, and the like. Of course, the feedback and context of execution of the apps (including whether the application was executed locally or remotely), is provided to the learning engine 806 where the scores associated with the executed apps give the current context is updated, if appropriate.

Figure 9:
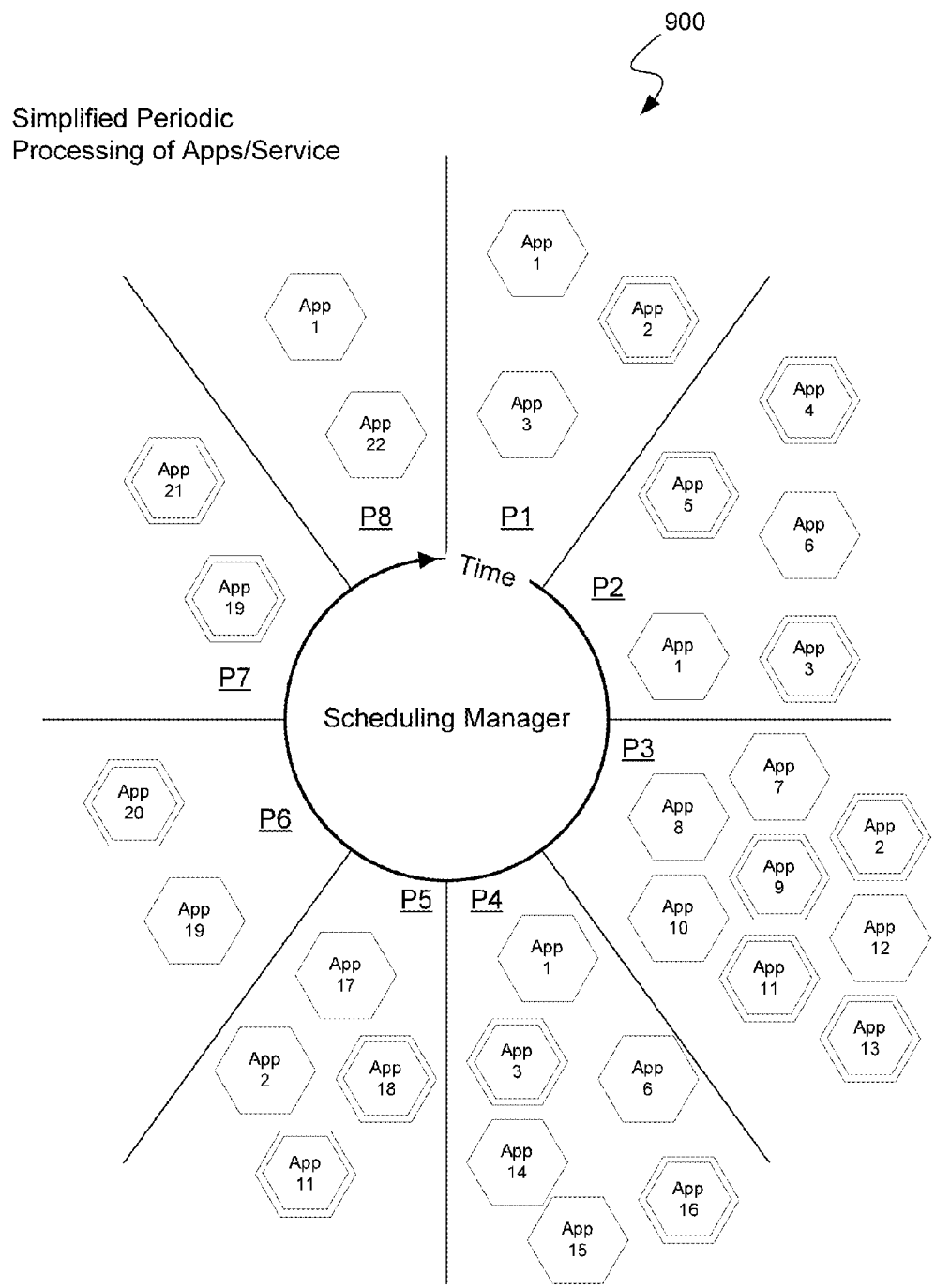
FIG. 9 is a pictorial diagram illustrating a simplified pattern of executing apps on a computing device.

Through updating the scores of apps in view of a given context, the scheduling manager rewards apps for providing useful data, features, and/or services, penalizes apps when the data, features, and/or services provided by an app is less useful, and leverages this information to efficiently manage the execution of apps on the local computing device 202. Typically, a pattern will develop with regard to the execution of apps. FIG. 9 is a pictorial diagram illustrating a simplified pattern 900 of executing apps on a computing device, such as computing device 202. For purposes of illustration only, the simplified pattern is cyclical, dividing into eight periods, P1-P8. Apps, including apps App1-App22, are executed during various periods. Among the apps shown in various time periods of the simplified pattern 900 are indications as to whether an app is executed locally or remotely. For purposes of illustration, those apps that are executed remotely are so indicated by a double outline, such as App2 of time period P1 or App5 of time period P2. As can be seen in the simplified pattern, there may be times that an app is executed locally (as determined by the scheduling manager 460), and times that the same app is executed remotely. For example, during time period P1, the app App3 is executed locally (as indicated by a single border) whereas the same app is executed remotely during time period P4.

As discussed above and as can be seen in FIG. 9, a different number of apps is executed (or not) depending on the time period as well as current context of the computing device. For example, assuming that time periods P6-P8 correlate to nighttime, the number of apps to execute on behalf of the associated user is substantially lower than during awake hours for the user.

Figure 10:
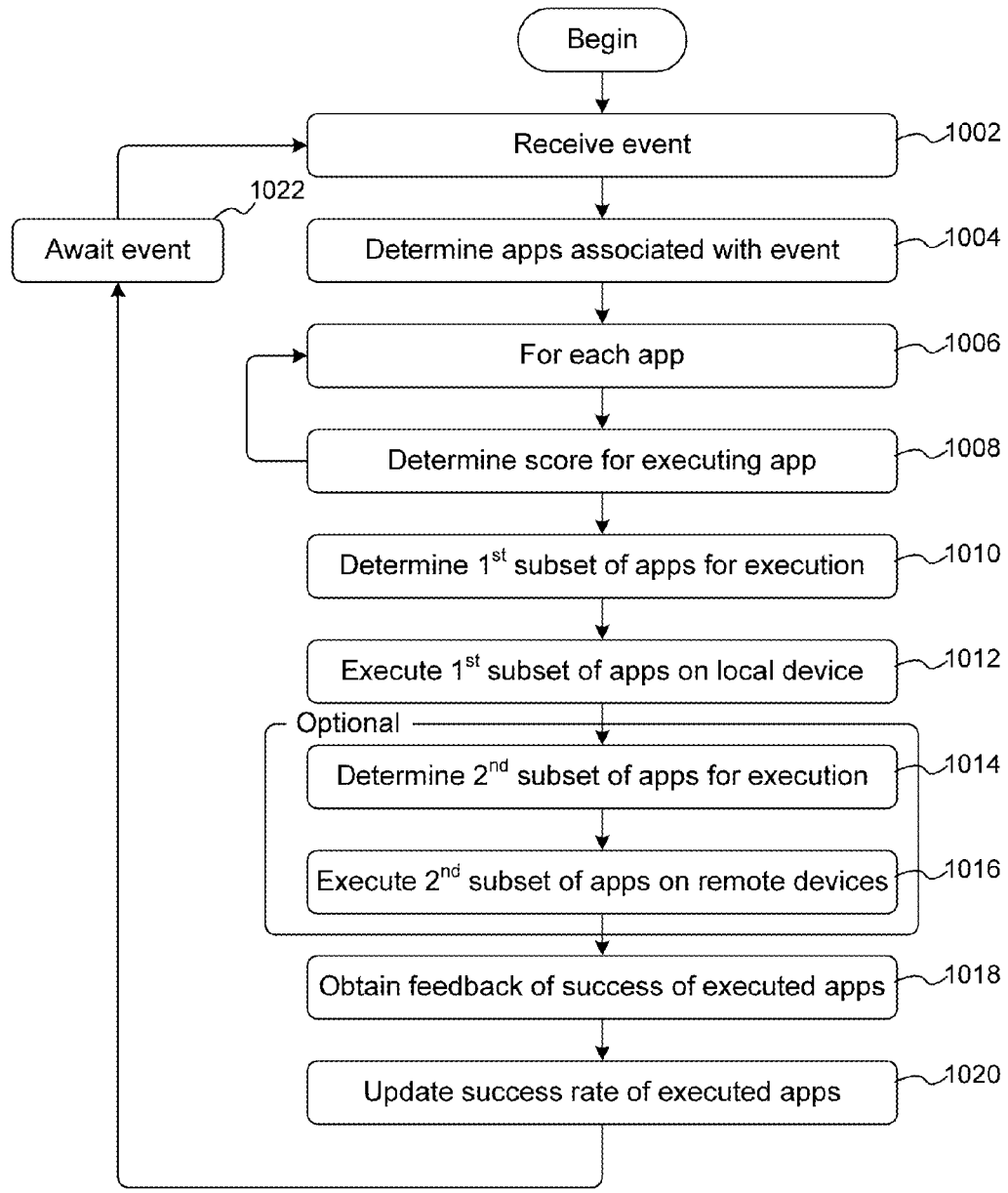
FIG. 10 is a flow diagram of an exemplary routine for executing apps on behalf of an associated user.

Turning now to FIG. 10, FIG. 10 illustrates a flow diagram of an exemplary routine 1000 for executing apps on behalf of a user, as described above in regard to the scheduling manager 460. Beginning at block 1002, the scheduling manager 460 receives notice of an event. The event may correspond to a particular time (e.g., time of day, day of week, or day of year) or to a particular event from the one or more sensors 418 on the computing device. At block 1004, a determination as to the apps that may be associated with or responsive to the detected event, or which could be executed given the current context, is made, resulting in the initial set of apps discussed above in regard to FIG. 8. At block 1006, an iteration loop is begun to iterate through each of the apps in the initial set of apps. As part of this iteration, at block 1008, a score (given the current context and event) for the currently iterated app is determined. After determining the score of the currently iterated app, the routine 1000 either repeats (returning to block 1006) to iterate to another app of the initial set of apps, or proceeds to block 1010 when there are no more apps to score.

At block 1010, a first subset of the apps is determined. As suggested above, this first set of apps is determined according to those apps having the highest scores, and meeting or exceeding a predetermined threshold in light of the current capabilities of the local computing device 202. At block 1012, the apps of the first subset are executed.

As indicated above, not all apps must be executed on the local computing device 202 but, instead, may be executed on remote computing devices (such as sibling computing devices). Accordingly, at block 1014, a second subset of apps is optionally identified for execution. As with the first subset of apps, these are apps that meet or exceed a predetermined threshold—though potentially a different threshold, specific to apps executed on remote devices, than those that the apps in the first subset of apps must meet. At block 1016, the apps of the second subset of apps are executed on remote computing devices. More specifically, the apps of the second subset of apps are caused to be executed on remote computing devices, as the scheduling manager may or may not be able to directly execute the apps on a remote device.

At block 1018, the scheduling manager 460 obtains feedback regarding the success or usefulness of the executed apps. In other words, the scheduling manager 460 feedback of the executed apps as to whether they provided useful data given the current context (success) or whether they did not provide useful data (no success) given the current context with depreciated scores. This feedback information is provided to the learning engine 806 and at block 1020 the scores associated with the apps (where appropriate) given the current context of execution (including where the app was executed) is updated. Thereafter, the routine 1000 proceeds to block 1022 where the routine awaits the next event and repeats the steps described above.

As will be appreciated, the iterative process of rewarding those apps, applications and/or services that provide useful information, data, or functionality for a given set of contextual factors will begin to favor a subset of all available apps, applications and/or services over all others. However, those apps that have an associated lower score or, perhaps, no score at all, may actually be of great value to the associated user at certain times. To ensure that scheduling manager 460 continually tries to improve on the overall performance of scheduling apps for execution, various measures may be implemented. Of course, a first measure is that the associated user may explicitly cause the execution of a particular app. The feedback for explicit user execution may be sufficient to cause that the app's associated score be raised to the level that it can meet the predetermined thresholds for a given set of contextual factors.

A second measure to ensuring that that scheduling manager 460 continually tries to improve on the overall performance of scheduling apps is to include a responsive app (one that is identified as being responsive to the triggering event) that does not meet the predetermined threshold for execution on the local device when the processing load of the computing device is sufficient to allow the responsive app to execute with the other apps that meet the predetermined threshold.

Yet another measure is to associate a length of time to be delayed as a function of an app's associated score. In this, the app (who's associated score falls below the predetermined threshold) would be delayed by the associated length of time before it could be considered for execution by the scheduling manager 460. Still further, similar measures may be implemented with the apps for remote execution. Thus, the determinations of blocks 1010 and 1014 may be modified from the description above to include other apps that do not meet the associated predetermined threshold.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A mobile computing device configured to provide personal assistance to an associated user, the computing device comprising a processor and a memory, wherein the processor executes instructions to provide personal assistant to the associated user in conjunction with additional components, the additional components comprising:
    a scheduling manager, wherein in execution on the mobile computing device, the scheduling manager is configured to:
        receive notice of an event;
        determine a set of apps that are responsive to the event;
        determine a first subset of apps of the determined set of apps according to a score associated with each of the apps of the set of apps, wherein the first subset of apps includes apps with an associated score that meets or exceeds a predetermined threshold; and
        execute the apps of the first subset of apps on the mobile computing device.

2. The computing device of claim 1, wherein the scheduling manager is further configured to:
    obtain feedback information regarding the usefulness of the executed apps of the first subset of apps; and
    update the associated score of each of the apps of the first subset of apps.

3. The computing device of claim 1, wherein the scheduling manager is further configure to:
    determine a second subset of apps of the determined set of apps according to the score associated with each of the apps of the set of apps, wherein the second subset of apps includes apps with an associated score that meets or exceeds a second predetermined threshold;
    cause the execution of the apps of the second subset of apps on one or more remote computing devices;
    obtain feedback information regarding the usefulness of the executed apps of the second subset of apps; and
    update the associated score of each of the apps of the second subset of apps.

4. The computing device of claim 3, wherein at least one of the one or more remote computing devices is a sibling device executing a personal daemon associated with the associated user.

5. The computing device of claim 3, wherein determining the first subset of apps according to a score associated with each of the apps of the set of apps comprises determining a first subset of apps according to a score associated with each of the apps of the set of apps for a set of current contextual factors.

6. The computing device of claim 5, wherein determining the second subset of apps according to a score associated with each of the apps of the set of apps comprises determining a second subset of apps according to a score associated with each of the apps of the set of apps for the set of current contextual factors.

7. The computing device of claim 6, wherein the set of current contextual factors includes any one or more of the current processing capacity of the mobile computing device, the current processing capacity comprising one or more of the processing load of the mobile computing device, the processing capabilities of the mobile computing device, the current capacity of the mobile computing device's power supply, the availability and bandwidth of network connectivity, and availability of data or resources.

8. The computing device of claim 4 further comprising a machine learning engine configured to:
    obtain the feedback information regarding the usefulness of the executed apps of the first subset of apps; and
    update the scores of the associated score of each of the apps of the first subset of apps according to the obtained feedback and the set of current contextual factors.

9. A computing device implemented method for providing personal assistance to an associated user, the method comprising each of the following as implemented on a mobile computing device:
    executing a scheduling manager on the mobile computing device, wherein the scheduling manager responds to one or more events, and in response to receiving an event, the scheduling manager is configure to:
        determine a set of apps that are responsive to the received event;
        determine a first subset of apps of the determined set of apps according to a score associated with each of the apps of the set of apps, wherein the first subset of apps includes apps with an associated score that meets or exceeds a predetermined threshold; and
        execute the apps of the first subset of apps on the mobile computing device.

10. The computing device implemented method of claim 9, wherein the scheduling manager is further configured to:
    obtain feedback information regarding the usefulness of the executed apps of the first subset of apps; and
    update the associated score of each of the apps of the first subset of apps according to the obtained feedback regarding the usefulness of the executed apps of the first subset of apps.

11. The computing device implemented method of claim 9, wherein the scheduling manager is further configure to:
    determine a second subset of apps of the determined set of apps according to the score associated with each of the apps of the set of apps, wherein the second subset of apps includes apps with an associated score that meets or exceeds a second predetermined threshold;
    cause the execution of the apps of the second subset of apps on one or more remote computing devices;
    obtain feedback information regarding the usefulness of the executed apps of the second subset of apps; and
    update the associated score of each of the apps of the second subset of apps according to the obtained feedback information regarding the usefulness of the executed apps of the second subset of apps.

12. The computing device implemented method of claim 11, wherein:

determining the first subset of apps according to a score associated with each of the apps of the set of apps comprises determining a first subset of apps according to a score associated with each of the apps of the set of apps for a set of current contextual factors; and determining the second subset of apps according to a score associated with each of the apps of the set of apps comprising determining a second subset of apps according to a score associated with each of the apps of the set of apps for the set of current contextual factors.

13. The computing device implemented method of claim 12, wherein the set of current contextual factors includes one or more of the current processing capacity of the mobile computing device, the current processing capacity comprising one or more of the processing load of the mobile computing device, the processing capabilities of the mobile computing device, the current capacity of the mobile computing device's power supply, the availability and bandwidth of network connectivity, and availability of data or resources.

14. The computing device implemented method of claim 12, wherein the set of current contextual factors includes one or more of the current time of day, the current day of week, the current day of year, and whether the current day is a holiday or in a holiday season.

15. A computer readable medium bearing computer executable instructions which, when executed on a mobile computing device having at least a processor and a memory, carry out a method for providing personal assistance to a user, the method comprising:

executing a scheduling manager on the mobile computing device, wherein the scheduling manager responds to one or more events in support of the personal daemon, and in response to receiving an event, the scheduling manager is configure to:

determine a set of apps that are responsive to the received event;

determine a first subset of apps of the determined set of apps according to a score associated with each of the apps of the set of apps in view of a set of current contextual factors, wherein the first subset of apps includes apps with an associated score that meets or exceeds a predetermined threshold; and execute the apps of the first subset of apps on the mobile computing device.

16. The computer readable medium of claim 15, wherein the scheduling manager is further configured to:

determine a second subset of apps of the determined first subset of apps according to the score associated with each of the apps of the set of apps in view of the set of current contextual factors, wherein the second subset of apps includes apps with an associated score that meets or exceeds a second predetermined threshold; and cause the execution of the apps of the second subset of apps on one or more remote computing devices, wherein at least one of the one or more remote computing devices is a sibling device executing a personal daemon associated with the associated user.

17. The computer readable medium of claim 16, wherein the scheduling manager is further configured to:

obtain feedback information regarding the usefulness of the executed apps of the first subset of apps and the second subset of apps; and update the associated score of each of the apps of the first subset of apps and the second subset of apps.

18. The computer readable medium of claim 17, wherein the method further comprises:

executing a machine learning engine on the mobile computing device, wherein the machine learning engine is configured to:

obtain the feedback information regarding the usefulness of the executed apps of the first subset of apps and the second subset of apps; and update the scores of the associated score of each of the apps of the first subset of apps and second subset of apps according to the obtained feedback and the set of current contextual factors.

* * * * *